United States Patent
Son et al.

(10) Patent No.: US 12,438,240 B2
(45) Date of Patent: Oct. 7, 2025

(54) CYLINDRICAL BATTERY AND BATTERY PACK INCLUDING THE SAME

(71) Applicant: LG ENERGY SOLUTION, LTD., Seoul (KR)

(72) Inventors: Ju Nam Son, Daejeon (KR); Jung Jin Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 744 days.

(21) Appl. No.: 17/633,762

(22) PCT Filed: Sep. 17, 2020

(86) PCT No.: PCT/KR2020/012545
§ 371 (c)(1),
(2) Date: Feb. 8, 2022

(87) PCT Pub. No.: WO2021/066360
PCT Pub. Date: Apr. 8, 2021

(65) Prior Publication Data
US 2022/0278430 A1     Sep. 1, 2022

(30) Foreign Application Priority Data

Oct. 2, 2019 (KR) .................. 10-2019-0122562
Sep. 16, 2020 (KR) .................. 10-2020-0118906

(51) Int. Cl.
*H01M 50/533*     (2021.01)
*H01M 50/107*     (2021.01)
(Continued)

(52) U.S. Cl.
CPC ....... *H01M 50/533* (2021.01); *H01M 50/107* (2021.01); *H01M 50/152* (2021.01); *H01M 50/528* (2021.01)

(58) Field of Classification Search
CPC ............. H01M 50/533; H01M 50/107; H01M 50/152; H01M 50/528; H01M 50/179
See application file for complete search history.

(56) References Cited

U.S. PATENT DOCUMENTS 6,117,576 A     9/2000     Sugai
7,378,182 B2    5/2008     Maeda
(Continued)

FOREIGN PATENT DOCUMENTS

CN     1217825 A       5/1999
CN     106169540 A     11/2016
(Continued)

OTHER PUBLICATIONS

Extended European Search Report for European Application No. 20870910.5, dated Jul. 25, 2022.
(Continued)

*Primary Examiner* — Robert S Carrico
(74) *Attorney, Agent, or Firm* — Birch, Stewart, Kolasch & Birch, LLP

(57) ABSTRACT

Disclosed is a cylindrical battery in which electrode assembly is built into a battery case, wherein a top cap is mounted at the upper part of the electrode assembly, the top cap and the electrode assembly are electrically connected by a positive electrode tab, and the positive electrode tab includes an extension portion protruding from the folded portion of the positive electrode tab.

14 Claims, 6 Drawing Sheets

(51) Int. Cl.
*H01M 50/152* (2021.01)
*H01M 50/528* (2021.01)

(56) References Cited

U.S. PATENT DOCUMENTS

| | | |
|---|---|---|
| 2002/0122974 A1 | 9/2002 | Kim |
| 2004/0126650 A1* | 7/2004 | Kim .................... H01M 50/169 |
| | | 429/61 |
| 2009/0136840 A1 | 5/2009 | Kim |
| 2010/0216013 A1 | 8/2010 | Kim |
| 2011/0076532 A1 | 3/2011 | Ha |
| 2013/0273401 A1 | 10/2013 | Lee et al. |
| 2014/0302358 A1 | 10/2014 | Kim et al. |
| 2017/0025682 A1 | 1/2017 | Ji et al. |
| 2019/0081312 A1 | 3/2019 | Yang et al. |
| 2020/0403210 A1* | 12/2020 | Tse ...................... H01M 50/533 |

FOREIGN PATENT DOCUMENTS

| | | | |
|---|---|---|---|
| JP | 2001202946 A | * | 7/2001 |
| JP | 2013-97903 A | | 5/2013 |
| JP | 2014-531128 A | | 11/2014 |
| JP | 2010-199069 A | | 8/2025 |
| KR | 10-2006-0085444 A | | 7/2006 |
| KR | 10-2006-0112729 A | | 11/2006 |
| KR | 10-2008-0007799 A | | 1/2008 |
| KR | 10-2008-0071312 A | | 8/2008 |
| KR | 10-2009-0053470 A | | 5/2009 |
| KR | 10-2013-0122051 A | | 11/2013 |
| KR | 10-2014-0017743 A | | 2/2014 |
| KR | 10-2017-0010587 A | | 2/2017 |
| KR | 10-2019-0029962 A | | 3/2019 |

OTHER PUBLICATIONS

International Search Report for PCT/KR2020/012545 mailed on Jan. 6, 2021.

* cited by examiner

【FIG. 1】 Conventional Art
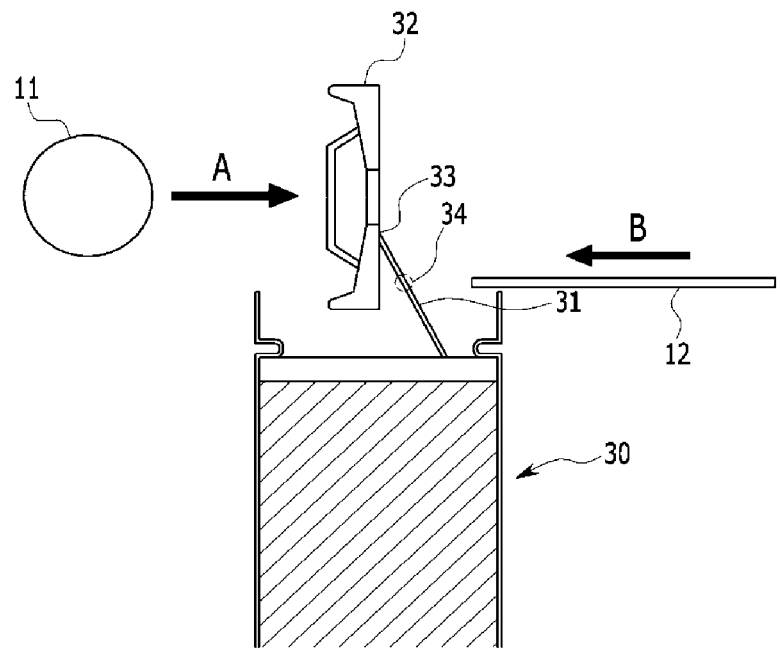
【FIG. 2】 Conventional Art
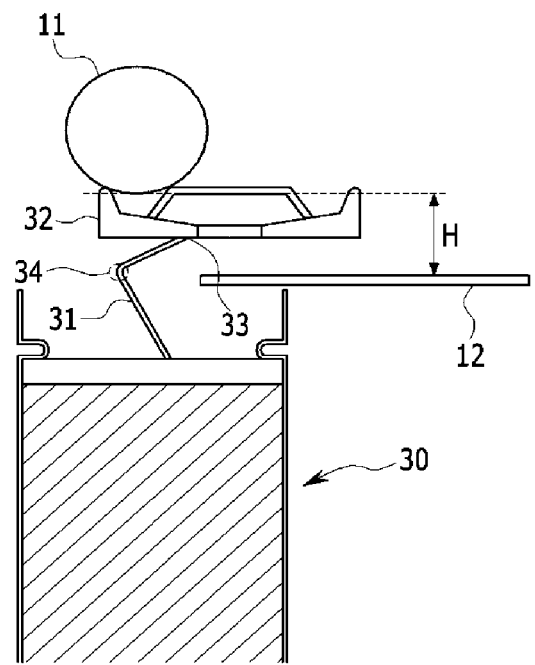

[FIG. 3]
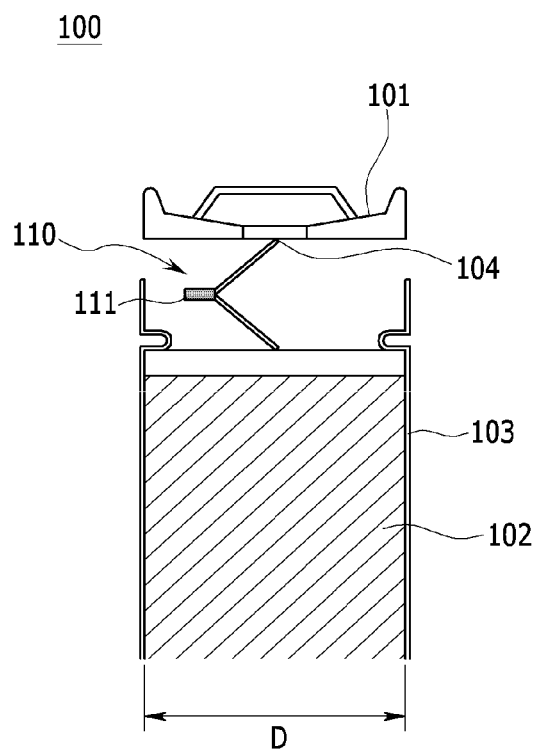

[FIG. 4]
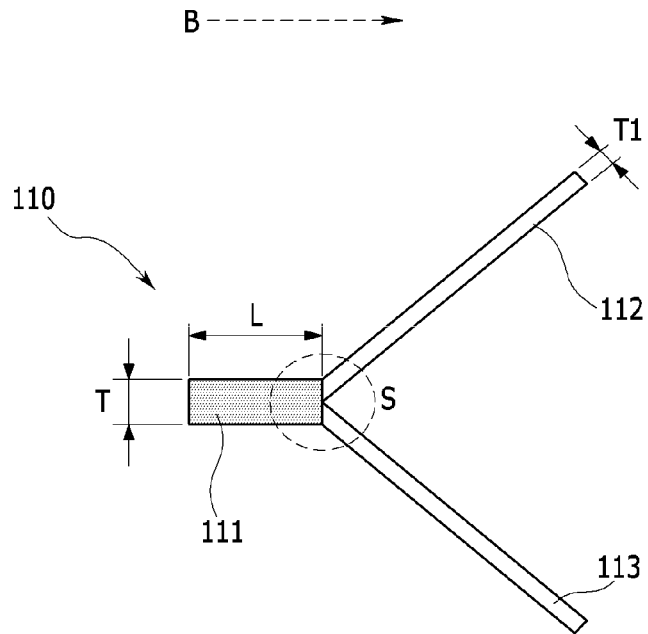
[FIG. 5]
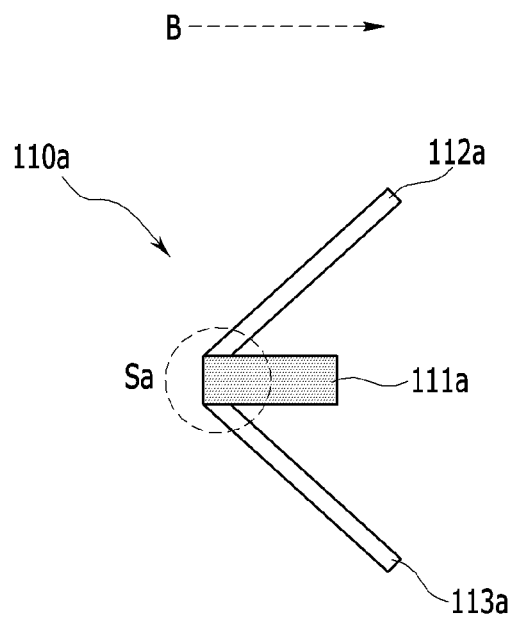

[FIG. 6]
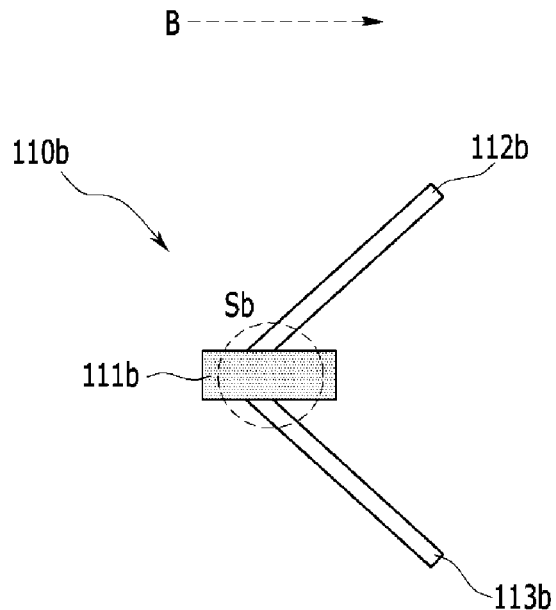
[FIG. 7]
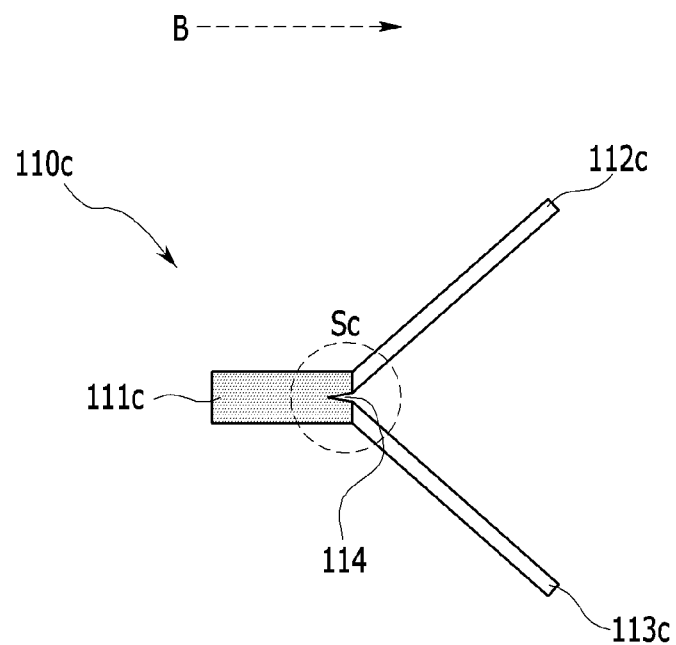

[FIG. 8]
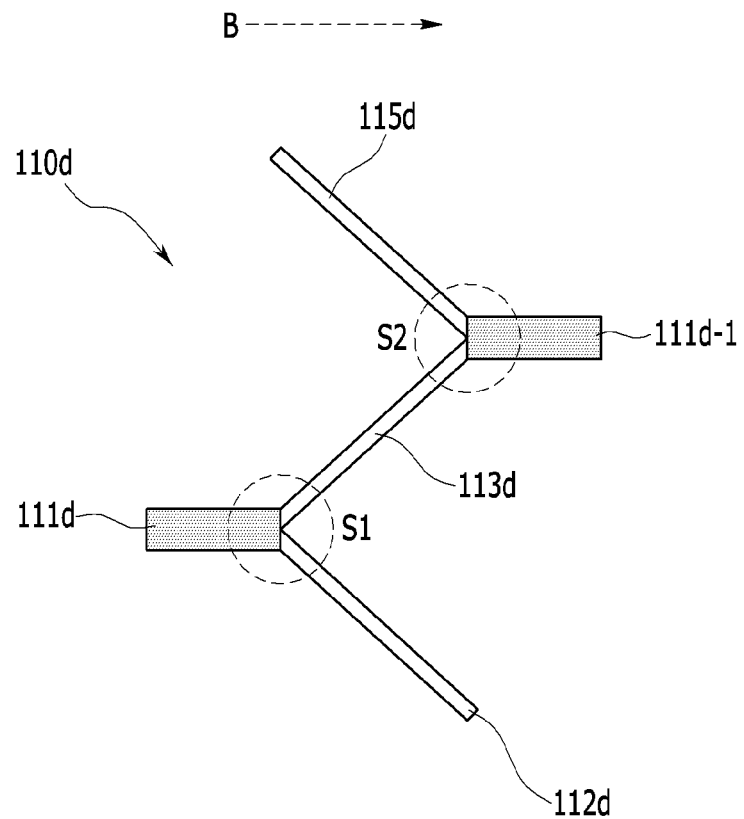

[FIG. 9]
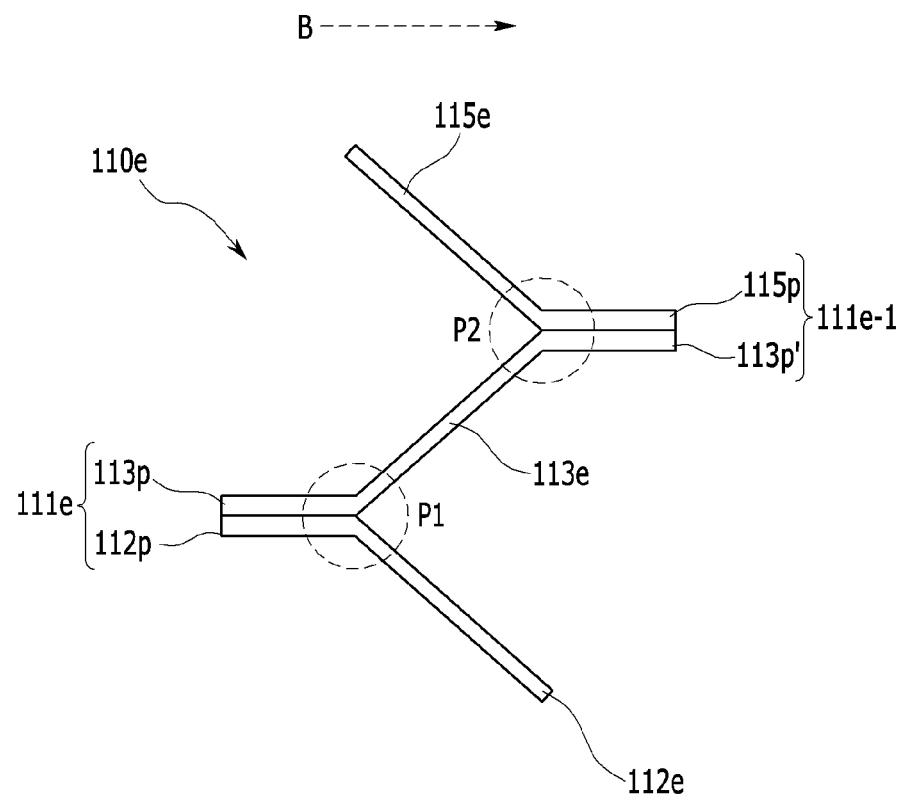

CYLINDRICAL BATTERY AND BATTERY PACK INCLUDING THE SAME

CROSS CITATION WITH RELATED APPLICATION(S)

This application is the National Phase of PCT International Application No. PCT/KR2020/012545, filed on Sep. 17, 2020, which claims the benefit of Korean Patent Application No. 10-2019-0122562 filed on Oct. 2, 2019 and Korean Patent Application No. 10-2020-0118906 filed on Sep. 16, 2020 in the Korean Intellectual Property Office, each of which is incorporated herein by reference in its entirety.

TECHNICAL FIELD

The present disclosure relates to a cylindrical battery and a battery pack including the same.

BACKGROUND ART

Recently, as energy prices are increasing due to the depletion of fossil fuels and increasing attention is being paid to environmental pollution, the demand for environmentally-friendly alternative energy sources acts as an essential factor for future life. Thus, research into techniques for generating various kinds of power, such as nuclear energy, solar energy, wind energy, and tidal power, is underway, and power storage apparatuses for more efficient use of the generated energy are also drawing much attention.

Moreover, as technology development and demands for mobile devices and battery vehicles increase, the demand for batteries as energy sources is rapidly increasing. Accordingly, much research on batteries capable of meeting various needs has been carried out. In particular, in terms of the material for batteries, the demand for lithium secondary batteries, such as lithium ion batteries and lithium ion polymer batteries, which have advantages such as high energy density, discharge voltage, and output stability, is very high.

Secondary batteries may be classified based on the structure of an electrode assembly, in which a positive electrode, a negative electrode, and a separator interposed between the positive electrode and the negative electrode are stacked. Typically, the electrode assembly may include a jelly-roll (wound) type structure in which a long sheet type positive electrode and a long sheet type negative electrode are wound in a state where a separator is disposed therebetween, or a stacked (laminated) type structure in which pluralities of positive electrodes and negative electrodes, which are cut into predetermined unit sizes, are sequentially stacked in a state where separators are disposed therebetween. Recently, in order to solve the problems involved in the jelly-roll type electrode assembly and the stack type electrode assembly, there has been developed a stacked/folded type electrode assembly having an improved structure, which is a combination of the jelly-roll type electrode assembly and the stacked type electrode assembly. The stacked/folded type electrode assembly has a structure in which unit cells stacked with certain units of the positive electrodes and the negative electrodes are sequentially wound with a separation film while a separator is interposed therebetween.

These electrode assemblies are mounted in a pouch case, a cylindrical can, a prismatic case, and the like depending on the purpose of use to produce a battery.

Among them, the cylindrical battery has the advantages of being easy to manufacture and having a high energy density per weight, and thus, is used as an energy source for various devices ranging from portable computers to electric vehicles.

FIGS. 1 and 2 are schematic diagrams showing a process of folding a positive electrode tab of a conventional cylindrical battery.

Referring to FIGS. 1 and 2, the cylindrical battery 30 folds a positive electrode tab 31 using a jig 11 and a folding knife 12 of the cylindrical battery manufacturing apparatus. The positive electrode tab 31 is welded to a connection portion 33 of a top cap 32, and the jig 11 located on one side of the top cap 32 is moved in the first direction A to press the top cap 32, and simultaneously, the folding knife 12 located on the other side of the top cap 32 is moved in the second direction B to press a folded portion 34. The jig 11 and the folding knife 12 are mutually separated by a height H.

Generally, the positive electrode tab 31 has a thin band shape with a thickness of about 0.05 to 0.3 mm, so that when the folded portion 34 is pressed and bent by the folding knife 12, the physical durability and rigidity of the folded portion 34 become weak. Thus, when a strong stress acts or a continuous stress acts on the folded portion 34 due to external vibration, there is a problem in that the folded portion 34 is disconnected.

DETAILED DESCRIPTION OF THE INVENTION

Technical Problem

It is an object of the present disclosure to provide a cylindrical battery that can prevent the positive electrode tab from being disconnected by external vibration, and a battery pack including the same.

However, the problem to be solved by embodiments of the present disclosure is not limited to the above-described problems, and can be variously expanded within the scope of the technical idea included in the present disclosure.

Technical Solution

A cylindrical battery according to one embodiment of the present disclosure includes a battery case, an electrode assembly located in the battery case, a top cap located at an upper part of the electrode assembly, and a positive electrode tab electrically connecting the top cap and the electrode assembly, the positive electrode tab having at least one folded portion and an extension portion protruding from the folded portion.

The positive electrode tab may include a first connection portion and a second connection portion that are interconnected at the folded portion.

A first end of the first connection portion may be connected to a connection portion of the top cap and a second end of the first connection portion may be connected to the folded portion.

A first end of the second connection portion may be connected to the electrode assembly and a second end of the second connection portion may be connected to the folded portion.

The extension portion may include a first bent portion that is bent and extended from an end of the first connection portion and a second bent portion that is bent and extended from an end of the second connection portion, and the first bent portion may be welded to the second bent portion.

The extension portion may extend in a direction opposite to a direction in which the first connection portion and the second connection portion extend at the folded portion.

The extension portion may extend in a direction in which the first connection portion and the second connection portion extend at the folded portion, and the extension portion may be formed between the first connection portion and the second connection portion.

The extension portion may have a first end and a second end spaced from the first end, the first connection portion may have a first end connected to the extension portion at a location between the first end and the second end, and the second connection portion has a first end connected to the extension portion at a location between the first end and the second end. The extension portion may include a stress distribution induction portion between the first connection portion and the second connection portion.

The stress distribution induction portion may be a notch.

The stress distribution induction portion may be formed in a direction in which the extension portion extends.

The positive electrode tab may include two or more of the extension portions.

The positive electrode tab may include two or more folded portions.

The positive electrode tab may be Z-shaped.

A battery pack including the cylindrical battery according to the present disclosure as a unit battery can be provided.

Advantageous Effects

As described above, the cylindrical battery according to the embodiment of the present disclosure can prevent stress from being concentrating on the folded portion by forming an extension portion at the folded portion of the positive electrode tab.

BRIEF DESCRIPTION OF THE DRAWINGS

FIGS. 1 and 2 are schematic diagrams showing a process of folding a positive electrode tab of a conventional cylindrical battery.

FIG. 3 is a schematic view showing a cylindrical battery according to one embodiment of the present disclosure.

FIG. 4 is a schematic diagram showing the positive electrode tab of FIG. 3.

FIGS. 5 to 8 are schematic diagrams showing a positive electrode tab according to another embodiment of the present disclosure.

FIG. 9 is a schematic diagram showing a positive electrode tab according to another embodiment of the present disclosure.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Further, throughout the specification, when a portion is referred to as "including" a certain component, it means that it can further include other components, without excluding the other components, unless otherwise stated.

FIG. 3 is a schematic view showing a cylindrical battery according to one embodiment of the present disclosure. FIG. 4 is a schematic diagram showing the positive electrode tab of FIG. 3.

Referring to FIGS. 3 and 4, the cylindrical battery 100 may include a top cap 101, an electrode assembly 102, and a battery case 103. The electrode assembly 102 may be built in the battery case 103, and a top cap 101 may be mounted at the upper part of the electrode assembly 102.

The positive electrode tab 110 may include an extension portion 111, a first connection portion 112 and a second connection portion 113. One side of the first connection portion 112 may be electrically connected to a connection portion 104 of the top cap 101. The other side of the first connection portion 112 may have a structure connected to the folded portion S. One side of the second connection portion 113 may be electrically connected to the electrode assembly 102. The other side of the second connection portion 113 may have a structure connected to the folded portion S.

The extension portion 111 may be extended in a direction opposite to the direction B in which the first connection portion 112 and the second connection portion 113 are extended at the folded portion S. The thickness T of the extension portion 111 is not particularly limited, but may be formed to be thicker than the thickness T1 of the first connection portion 112. When the thickness T of the extension portion 111 is thicker than the thickness T1 of the first connection portion 112, it becomes easy to disperse the stress concentrated in the folded portion S toward the extension portion 111. The thickness T of the extension portion 111 is preferably formed within a range of 100% to 600% of the thickness T1 of the first connection portion 112. The second extension portion 113 may be formed in a thickness identical to the thickness T1 of the first connection portion 112.

The length L of the extension portion 111 is not particularly limited, but may be formed within a range of 10% to 40% of the diameter D (see FIG. 3) of the electrode assembly 102.

With such a structure, the stress to be transmitted to the folded portion S due to an external impact can be dispersed toward the extension portion 111, thus making it possible to prevent the folded portion S of the positive electrode tab 110 from being disconnected.

FIG. 5 is a schematic diagram showing a positive electrode tab according to another embodiment of the present disclosure.

Referring to FIG. 5, the positive electrode tab 110a may include an extension portion 111a, a first connection portion 112a, and a second connection portion 113a. The extension portion 111a may be extended in a direction B in which the first connection portion 112a and the second connection portion 113a are extended at the folded portion Sa. The extension portion 111a may be extended between the first connection portion 112a and the second connection portion 113a.

FIG. 6 is a schematic diagram showing a positive electrode tab according to another embodiment of the present disclosure.

Referring to FIG. 6, the positive electrode tab 110b may include an extension portion 111b, a first connection portion 112b, and a second connection portion 113b. The extension portion 111b may have a structure extending simultaneously in the direction B in which the first connection portion 112b and the second connection portion 113b are extended at the folded portion Sb, and in the direction opposite thereto.

With such a structure, the stress to be transmitted to the positive electrode tab 110b due to an external impact may be simultaneously dispersed in a direction B in which the first connection portion 112b and the second connection portion 113b are extended, and in the direction opposite thereto.

FIG. 7 is a schematic diagram showing a positive electrode tab according to another embodiment of the present disclosure.

Referring to FIG. 7, the positive electrode tab 110c may include an extension portion 111c, a first connection portion 112c, and a second connection portion 113c. The extension portion 111c may have a structure extending to a direction opposite to the direction B in which the first connection portion 112c and the second connection portion 113c are extended at the folded portion Sc. Further, the extension portion 111c may include a stress distribution induction portion 114 between the first connection portion 112c and the second connection portion 113c. As an example, the stress dispersion induction portion 114 may be a notch. The stress distribution induction portion 114 may be formed in a direction in which the extension portion 111c is formed.

With such a structure, the stress to be transmitted to the positive electrode tab 110c due to external impact may be dispersed in the direction in which the stress distribution induction portion 114 is formed. Through this, the operator can to disperse the stress in a desired direction by forming the stress dispersion induction portion 114 in a specific direction.

FIG. 8 is a schematic diagram showing a positive electrode tab according to another embodiment of the present disclosure.

Referring to FIG. 8, the positive electrode tab 110d may include a first extension portion 111d, a second extension portion 111d-1, a first connection portion 112d, a second connection portion 113d, and a third connection portion 115d. A first extension portion 111d may be formed between the first connection portion 112d and the second connection portion 113d. A second extension portion 111d-1 may be formed between the second connection portion 113d and the third connection portion 115d. The positive electrode tab 110d may be Z-shaped as a whole.

The first bent portion S1 may be formed at a portion where the first connection portion 112d and the second connection portion 113d are connected. The second bent portion S2 may be formed at a portion where the second connection portion 113d and the third connection portion 115d are connected.

The first extension portion 111d may have a structure extending in a direction opposite to the direction B in which the first connection portion 112d is extended. The second extension portion 111d-1 may have a structure extending in the direction B in which the first connection portion 112d is extended.

With such a structure, the stress to be transmitted to the positive electrode tab 110d due to an external impact can be dispersed in the first extension portion 111d and the second extension portion 111d-1 and removed immediately.

FIG. 9 is a schematic diagram showing a positive electrode tab according to another embodiment of the present disclosure.

Referring to FIG. 9, the positive electrode tab 110e may include a first extension portion 111e, a second extension portion 111e-1, a first connection portion 112e, a second connection portion 113e, and a third connection portion 115e. A first extension portion 111e may be formed between the first connection portion 112e and the second connection portion 113e. A second extension portion 111e-1 may be formed between the second connection portion 113e and the third connection portion 115e. The positive electrode tab 110d may be Z-shaped as a whole A first bent portion P1 may be formed at a portion where the first connection portion 112e and the second connection portion 113e are connected. A second bent portion P2 may be formed at a portion where the second connection portion 113e and the third connection portion 115e are connected.

The first extension portion 111e includes a first bent portion 112p that is bent and extended at the end of the first connection portion 112e, and a second bent portion 113p that is bent and extended at the end of the second connection portion 113e. The first bent portion 112p and the second bent portion 113p may have a structure extending in a direction opposite to the direction B in which the first connection portion 112e is extended. At this time, the first bent portion 112p and the second bent portion 113p may be mutually contacted and welded.

The second extension portion 111e-1 may have a structure extending in the direction B in which the first connection portion 112e is extended. The second extension portion 111e-1 may include a third bent portion 113p' that is bent and extended at an end part on the side opposite to the end part of the second connection portion 113e on which the second bent portion 113p is formed, and a fourth bent portion 115p bent and extended at the end of the third connection portion 115e. The third bent portion 113p' and the fourth bent portion 115p may have a structure extending in a direction B in which the first connection portion 112e is extended. In this case, the third bent portion 113p' and the fourth bent portion 115p may be mutually contacted and welded.

With such a structure, the stress to be transmitted to the positive electrode tab 110e due to an external impact may be dispersed in the first extension portion 111e and the second extension portion 111e-1 and can be rapidly removed.

In the above-described embodiment, the positive electrode tab 110e has been described based on a case in which the positive electrode tab 110e has a Z-shape as a whole, but the contents concerning the first extension portion 111e described in the present embodiment may be modified and applied to the extension portion 111 of the embodiment in FIG. 4.

Meanwhile, one or more cylindrical batteries according to the embodiment of the present disclosure can be packaged in a pack case to form a battery pack.

The above-mentioned cylindrical battery and a battery pack may be applied to various devices. These devices may be applied to vehicles such as an electric bicycle, an electric vehicle, a hybrid vehicle, but the present disclosure is not limited thereto but can be applied to transportation means such as an electric bicycle, an electric vehicle, a hybrid vehicle, but the present disclosure is not limited thereto and can be applied to various devices that can use the cylindrical battery and the battery pack including the same, which also belongs to the scope of the present disclosure.

Based on the above disclosure, this is to be understood by those of ordinary skill in the art that various applications and modifications can be made within the scope of the present disclosure.

DESCRIPTION OF REFERENCE NUMERALS 110, 110a, 110b, 110c, 110d, 110e: positive electrode tab
111, 111a, 111b, 111c: extension portion
111d, 111e: first extension portion
111d-1, 111e-1: second extension portion 112, 112a, 112b, 112c, 112d, 112e: first connection portion
113, 113a, 113b, 113c, 113d, 113e: second connection portion
114: stress dispersion induction portion
115d, 115e: third connection portion
S1, P1: first bent portion
S2, P2: second folded portion

The invention claimed is:

1. A cylindrical battery comprising:
a battery case;
an electrode assembly located in the battery case;
a top cap located at an upper part of the electrode assembly; and
a positive electrode tab electrically connecting the top cap and the electrode assembly, the positive electrode tab having at least one folded portion and an extension portion protruding from a first folded portion of the at least one folded portion, the extension portion being cantilevered from the first folded portion,
wherein the positive electrode tab includes a first connection portion and a second connection portion that are interconnected at the first folded portion,
wherein the extension portion is a single piece body having a thickness that is greater than a thickness of each of the first connection portion and the second connection portion.

2. The cylindrical battery according to claim 1,
wherein a first end of the first connection portion is connected to a connection portion of the top cap and a second end of the first connection portion is connected to the first folded portion.

3. The cylindrical battery according to claim 2,
wherein a first end of the second connection portion is connected to the electrode assembly and a second end of the second connection portion is connected to the first folded portion.

4. The cylindrical battery according to claim 1,
wherein the extension portion extends in a direction opposite to a direction in which the first connection portion and the second connection portion extend at the first folded portion.

5. The cylindrical battery according to claim 4,
wherein the extension portion includes a stress distribution induction portion between the first connection portion and the second connection portion.

6. The cylindrical battery according to claim 1,
wherein the extension portion extends in a direction in which the first connection portion and the second connection portion extend at the first folded portion, and
wherein the extension portion is formed between the first connection portion and the second connection portion.

7. The cylindrical battery according to claim 1,
wherein the extension portion includes a stress distribution induction portion between the first connection portion and the second connection portion.

8. The cylindrical battery according to claim 7,
wherein the stress distribution induction portion is a notch.

9. The cylindrical battery according to claim 8,
wherein the positive electrode tab is Z-shaped.

10. The cylindrical battery according to claim 7,
wherein the stress distribution induction portion is formed in a direction in which the extension portion extends.

11. The cylindrical battery according to claim 1,
wherein the at least one folded portion includes two or more folded portions.

12. The cylindrical battery according to claim 11,
wherein the extension portion is provided in plurality.

13. A battery pack comprising the cylindrical battery according to claim 1.

14. A cylindrical battery comprising:
a battery case;
an electrode assembly located in the battery case;
a top cap located at an upper part of the electrode assembly; and
a positive electrode tab electrically connecting the top cap and the electrode assembly, the positive electrode tab having at least one folded portion and an extension portion protruding from a first folded portion of the at least one folded portion,
wherein the positive electrode tab includes a first connection portion and a second connection portion that are interconnected at the first folded portion,
wherein the extension portion has a first end and a second end spaced from the first end,
wherein the first connection portion has a first end connected to the extension portion at a location between the first end and the second end at a first surface of the extension portion, and
wherein the second connection portion has a first end connected to the extension portion at a location between the first end and the second end at a second surface of the extension portion opposite the first surface.

* * * * *